(12) United States Patent
Choi et al.

(10) Patent No.: US 12,335,454 B2
(45) Date of Patent: Jun. 17, 2025

(54) APPARATUS AND METHOD FOR SYNTHESIZING THREE-DIMENSIONAL IMAGE

(71) Applicant: ELECTRONICS AND TELECOMMUNICATIONS RESEARCH INSTITUTE, Daejeon (KR)

(72) Inventors: Hongkyw Choi, Daejeon (KR); Bok Deuk Song, Daejeon (KR); Sung-Hoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 343 days.

(21) Appl. No.: 17/885,020

(22) Filed: Aug. 10, 2022

(65) Prior Publication Data

US 2023/0171389 A1 Jun. 1, 2023

(30) Foreign Application Priority Data

Nov. 29, 2021 (KR) .................. 10-2021-0167040
May 3, 2022 (KR) .................. 10-2022-0054494

(51) Int. Cl.
*H04N 13/156* (2018.01)
*G06T 7/50* (2017.01)
(Continued)

(52) U.S. Cl.
CPC ............. *H04N 13/156* (2018.05); *G06T 7/50* (2017.01); *G06T 17/00* (2013.01); *H04N 13/296* (2018.05)

(58) Field of Classification Search
CPC ...... H04N 13/156; H04N 13/296; G06T 7/50; G06T 17/00
See application file for complete search history.

(56) References Cited

U.S. PATENT DOCUMENTS 9,384,585 B2    7/2016  Kim et al.
2015/0222880 A1* 8/2015  Choi ................. G03B 35/08
                                                  348/43
(Continued)

FOREIGN PATENT DOCUMENTS

KR       1997-0058060 A      7/1997
KR       10-2013-0110339    10/2013
(Continued)

OTHER PUBLICATIONS

Gi-sig Byun et al, 'Design of Fuzzy Inference System for Cameras Inter-Axial Distance Controlof Remote Stereoscopic Photographs', Journal of the Korea Institute of Information and Communication Engineering, vol. 19, No. 1, pp. 41-49 (Jan. 9, 2015).

*Primary Examiner* — Mohamed A. Wasel
(74) *Attorney, Agent, or Firm* — KILE PARK REED & HOUTTEMAN PLLC (57) ABSTRACT

A 3D image synthesizing apparatus models a background to be imaged for each of positions to generate a background model at each of positions, sets a first IAD of a camera at each position based on the background model at each position, obtains a 3D image of the background imaged by the camera based on the first IAD, selects a target position corresponding to an object to be imaged from among the positions, sets a second IAD of the camera at the target position based on the first IAD set at the target position, obtains a 3D image of the object imaged by the camera based on the second IAD, and synthesizes the 3D image of the background and the 3D image of the object.

14 Claims, 7 Drawing Sheets

(51) Int. Cl.
*G06T 17/00* (2006.01)
*H04N 13/296* (2018.01)

(56) References Cited

U.S. PATENT DOCUMENTS

2016/0261841 A1* 9/2016 Mathew ............... H04N 13/344
2021/0118131 A1 4/2021 Chae et al.

FOREIGN PATENT DOCUMENTS

KR 10-1348929 1/2014
KR 10-2014-0041998 A 4/2014

* cited by examiner

APPARATUS AND METHOD FOR SYNTHESIZING THREE-DIMENSIONAL IMAGE

CROSS-REFERENCE TO RELATED APPLICATION

This application claims priority to and the benefit of Korean Patent Application No. 10-2021-0167040 filed in the Korean Intellectual Property Office on Nov. 29, 2021, and priority to and the benefit of Korean Patent Application No. 10-2022-0054494 filed in the Korean Intellectual Property Office on May 3, 2022, the entire contents of which are incorporated herein by reference.

BACKGROUND

(a) Field

The disclosure relates to an apparatus and a method for synthesizing a three-dimensional image.

(b) Description of the Related Art

As users become accustomed to online contents, they are demanding contents similar to reality. According to the needs of these users, technologies such as holograms, virtual reality (VR), augmented reality (AR), mixed reality (MR), and extended reality (XR) have been proposed for expressing the contents similar to reality.

In particular, in order to provide the contents similar to reality, a technology for producing a three-dimensional (3D) image is required. Although stereoscopic 3D imaging is used to produce the 3D image, the stereoscopic 3D imaging has a problem in that it is more complicated than two-dimensional (2D) imaging. Accordingly, a technique for separating and imaging a background image and an object image and then synthesizing them has been proposed.

However, the existing technology only enlarges or reduces the size of the object image at a set ratio and then synthesizes the object image on a set position of the background image, and does not consider a depth which is an important component of the 3D image, so that it is difficult to synthesize the 3D image without a sense of incongruity.

SUMMARY

Some embodiments may provide an apparatus and a method for synthesizing a 3D image without a sense of incongruity.

According to some embodiments, a method of synthesizing a 3D image performed by a computing device may be provided. The method may include modeling a background to be imaged for each of positions to generate a background model at each of a plurality of positions, setting a first IAD of a camera at each of the positions based on the background model at each of the positions, obtaining a 3D image of the background imaged by the camera based on the first IAD, selecting a target position corresponding to an object to be imaged from among the positions, setting a second IAD of the camera at the target position based on the first IAD set at the target position, obtaining a 3D image of the object imaged by the camera based on the second IAD, and synthesizing the 3D image of the background and the 3D image of the object.

In some embodiments, the setting the first IAD may include changing an IAD of the camera, checking a depth of the background model according to the changed IAD at each of the positions, repeating the changing the IAD and the checking the depth until an optimized depth is checked, and setting the IAD when the optimized IAD is checked as the first IAD.

In some embodiments, the method may further include storing the first IAD and the 3D image of the background at each of the positions in a database.

In some embodiments, the setting the second IAD may include retrieving the first IAD at the target position from the database.

In some embodiments, the second IAD at the target position may be equal to the first IAD set at the target position.

In some embodiments, the setting the second IAD may include modeling the object at the target position to generate an object model, checking a depth of the object model according to the first IAD set at the target position, and setting the second IAD based on a result of checking the depth.

The setting the second IAD based on the result may include repeating an operation of checking the depth while finely tuning an IAD of the camera until an optimized depth is checked, and setting the IAD when the optimized depth is checked as the second IAD.

In some embodiments, the method may further include storing the second IAD and the 3D image of the object at the target position in a database.

According to some embodiments of the present invention, a 3D image synthesizing apparatus including a memory configured to store one or more instructions and a processor configured to execute the one or more instructions. By executing the one or more instructions, the processor may set a first IAD of a camera at each of a plurality of positions of a background to be imaged, obtain a 3D image of the background imaged by the camera based on the first IAD, select a target position corresponding to an object to be imaged from among the positions, set a second IAD of the camera at the target position based on the first IAD set at the target position, obtain a 3D image of the object imaged by the camera based on the second IAD, and synthesize the 3D image of the background and the 3D image of the object.

In some embodiments, the processor may generate a plurality of background models by modeling the background at the positions, respectively, and set the first IAD at each of the positions based on a background model at a corresponding position among the background models.

In some embodiments, the processor may check a depth of the background model at the corresponding position according to an IAD of the camera at the corresponding position, repeat an operation of changing the IAD until an optimized depth is checked, and set the IAD when the optimized depth is checked as the first IAD.

In some embodiments, the processor may generate an object model by modeling the object at the target position, and set the second IAD at the target position based on the first IAD set at the target position and the object model.

In some embodiments, the processor may repeat an operation of checking a depth of the object model at the target position according to an IAD of the camera at the target position and finely tuning the IAD until an optimized depth is checked, and set the IAD when the optimized depth is checked as the second IAD.

According to some embodiments of the present invention, a method of synthesizing a 3D image performed by a computing device may be provided. The method may include setting a first IAD of a camera at each of a plurality of positions of a background to be imaged, selecting a target position corresponding to an object to be imaged from among the positions, setting a second IAD of the camera at the target position based on the first IAD set at the target position, and synthesizing a 3D image of the background imaged by the camera based on the first IAD and the 3D image of the object imaged by the camera based on the second IAD.

DETAILED DESCRIPTION OF THE EMBODIMENTS

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a" and "an" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Figure 1:
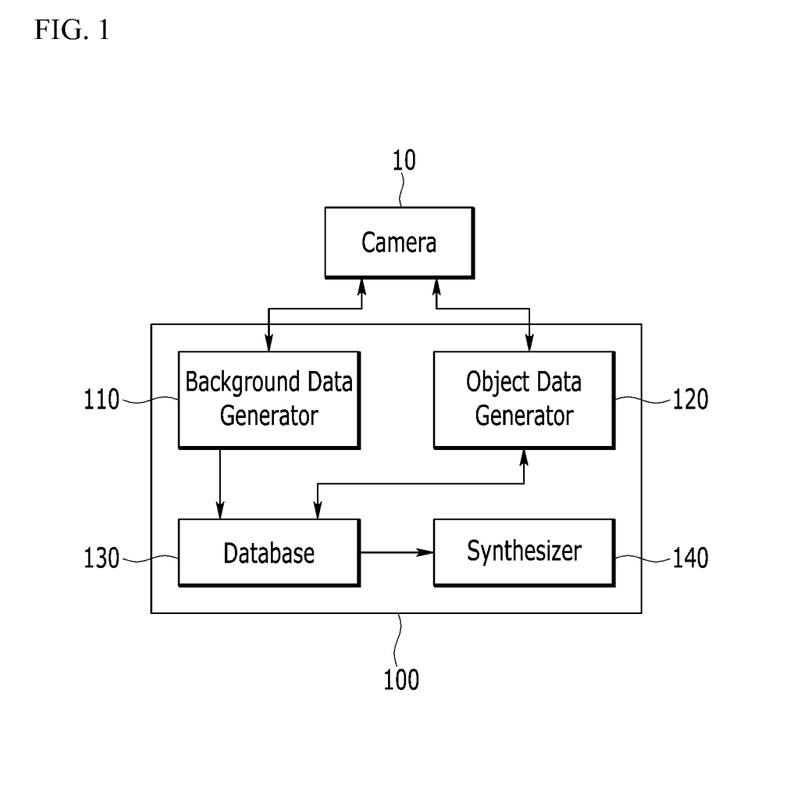
FIG. 1 is a diagram showing an example of a 3D image synthesizing system according to an embodiment of the present invention.

FIG. 1 is a diagram showing an example of a 3D image synthesizing system according to an embodiment of the present invention.

Referring to FIG. 1, a 3D image synthesizing system includes a 3D image synthesizing apparatus 100 and a camera 10.

The camera 10 is a camera capable of performing 3D imaging. In some embodiments, the camera may be a camera capable of performing stereoscopic 3D imaging.

The 3D image synthesizing apparatus 100 generates an 3D image by synthesizing a background image and an object image imaged by the camera 10. The 3D image synthesizing apparatus 100 includes a background data generator 110, an object data generator 120, a database 130, and a synthesizer 140. In some embodiments, the 3D image synthesizing apparatus 100 may be implemented by a computing device.

The background data generator 110 divides a 3D space (background) to be imaged for each position, and sets an optimized inter-axial distance (IAD) while checking a depth at each position. In order to obtain a 3D image of the background at each position, the background data generator 110 sets an IAD of the camera 10 to the optimized IAD at a corresponding position, and obtains the 3D image of the background imaged by the camera 10. The background data generator 110 stores the optimized IAD and the 3D image of the background at each position in the database 130. The background data generator 110 may repeat this operation for a plurality of positions into which the background is divided.

The object data generator 120 selects a position corresponding to an object to be imaged, and retrieves the optimized IAD at the selected position from the database 130. The object data generator 120 sets an IAD for the object based on the optimized IAD at the selected position, sets an IAD of the camera 10 to the IAD for the object, and obtains a 3D image of the object. In some embodiments, the camera 10 may image the object using a chroma-key technique. The object data generator 120 stores the IAD for the object and the 3D image of the object at the selected position in the database 130. The object data generator 110 may repeat this operation for a plurality of objects to be imaged.

The synthesizer 140 retrieves the 3D image of the background generated by the background data generator 110 and the 3D image of the object generated by the object data generator 120 from the database 130, and synthesizes the 3D image of the background and the 3D image of the object to generate a final 3D image.

Figure 2:
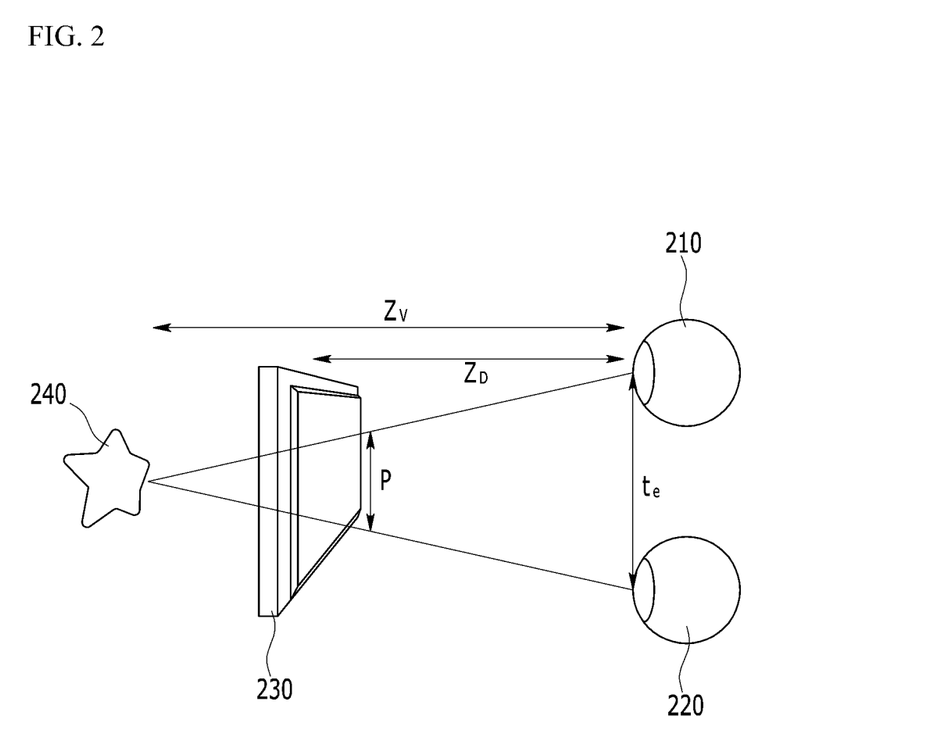
FIG. 2 is a diagram for explaining a relationship between an IAD of a camera and a depth.

FIG. 2 is a diagram for explaining a relationship between an IAD of a camera and a depth.

Generally, when a person sees an object, he/she sees an image with a parallax due to a distance between left and right eyes, and this visual parallax creates a 3D effect. Factors causing the 3D effect include binocular parallax according to the distance between the two eyes, binocular convergence, focus control, movement parallax, and psychological factors. In this case, the binocular parallax may correspond to an IAD of the camera.

Referring to FIG. 2, it is possible to obtain a 3D image in which an object 240 appears in front of a screen 230 or appears behind the screen 230, by calculating a depth according to an IAD of a camera corresponding to a distance between eyes 210 and 220 (or binocular parallax).

In this case, the depth $Z_V$ is defined based on the binocular parallax $t_e$, a distance $Z_D$ from the eye 210 to the screen 230, and the size P of the object 240 displayed on the screen 230, and the binocular parallax $t_e$ may be replaced by the IAD of the camera. For example, the depth $Z_V$ may be defined as in Equation 1.

$$Z_V = \frac{Z_D - t_e}{t_e - P} \qquad \text{Equation 1}$$

Therefore, since the depth may be calculated according to the IAD, it is possible to obtain an image (where the depth has a positive value) in which the object 240 appears behind the screen 230 or an image (where the depth has a negative value) in which the object 240 appears in front of the screen 230 by setting the IAD. Hereinafter, a method of synthesizing a 3D image based on an IAD is described with reference to FIG. 3 to FIG. 6.

Figure 3:
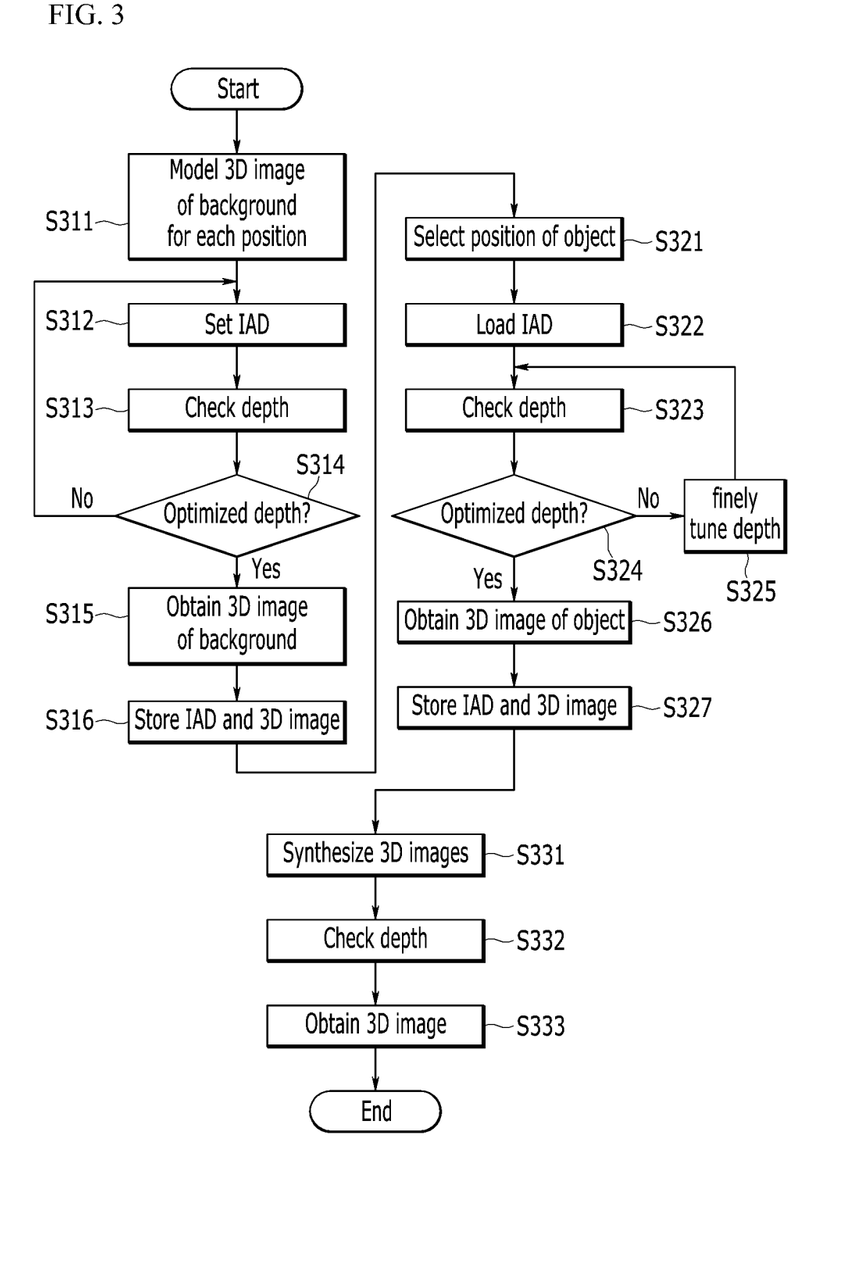
FIG. 3 is a flowchart showing an example of a 3D image synthesizing method according to an embodiment of the present invention.
Figure 4:
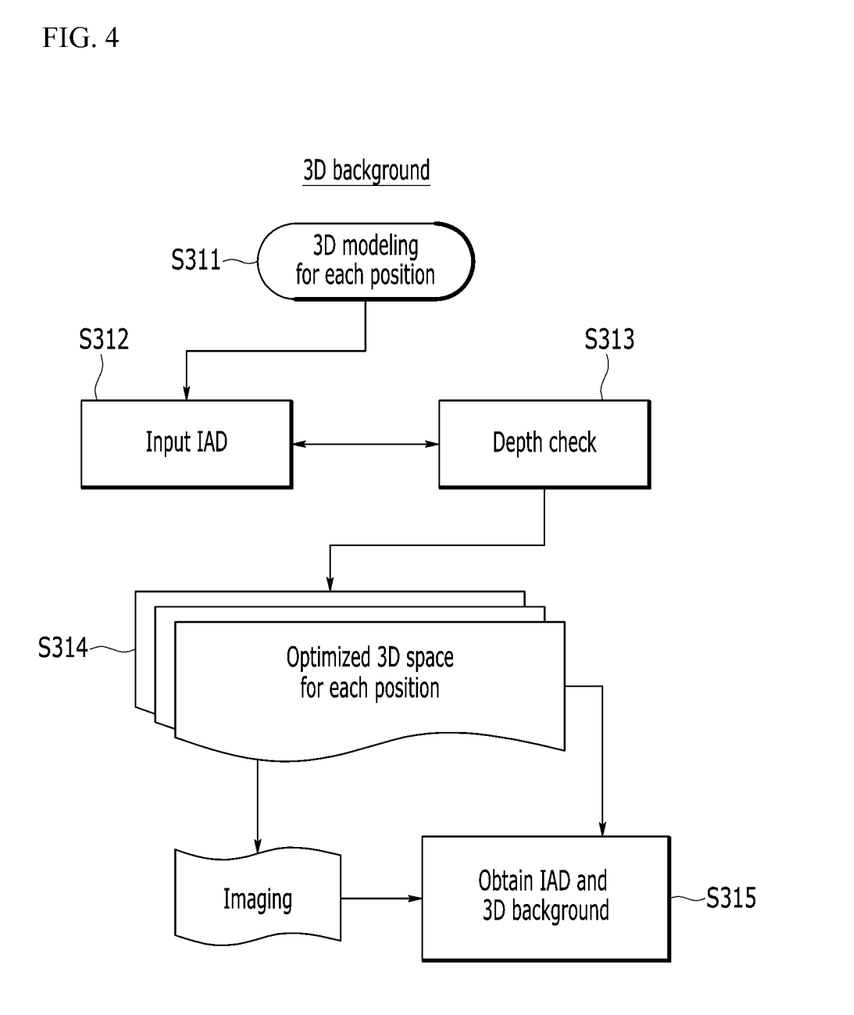
FIG. 4 is a diagram for explaining an example of generating a 3D space in a 3D image synthesizing method according to an embodiment of the present invention.
Figure 5:
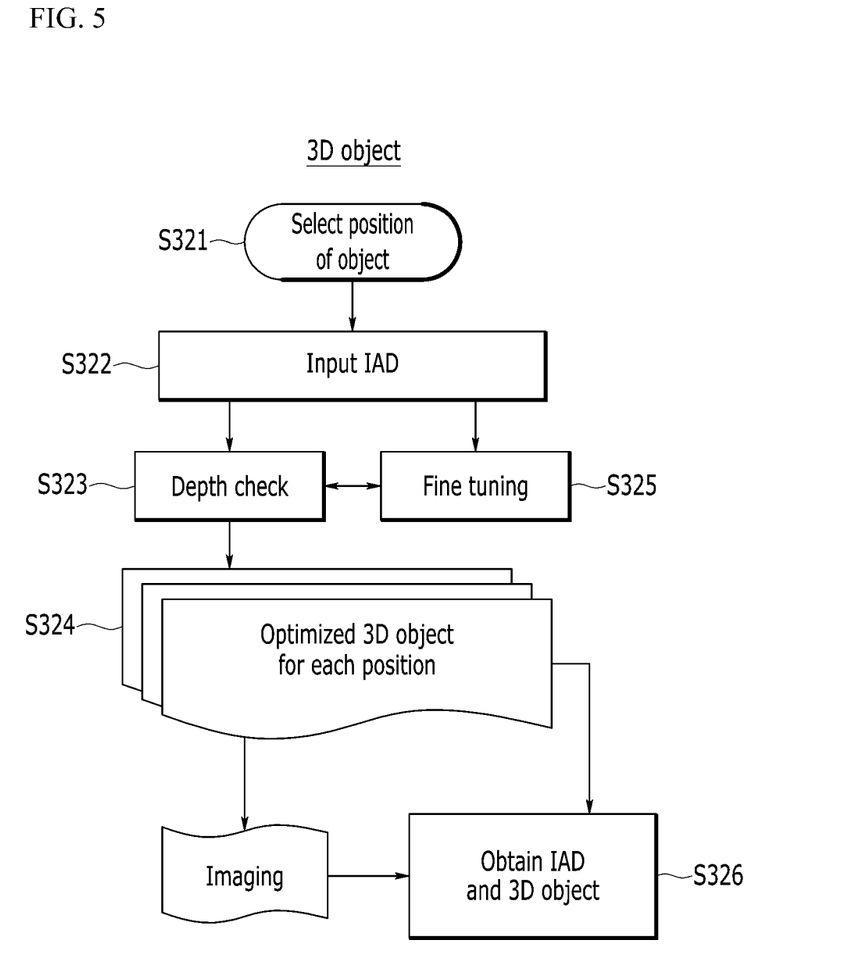
FIG. 5 is a diagram for explaining an example of generating a 3D object in a 3D image synthesizing method according to an embodiment of the present invention.
Figure 6:
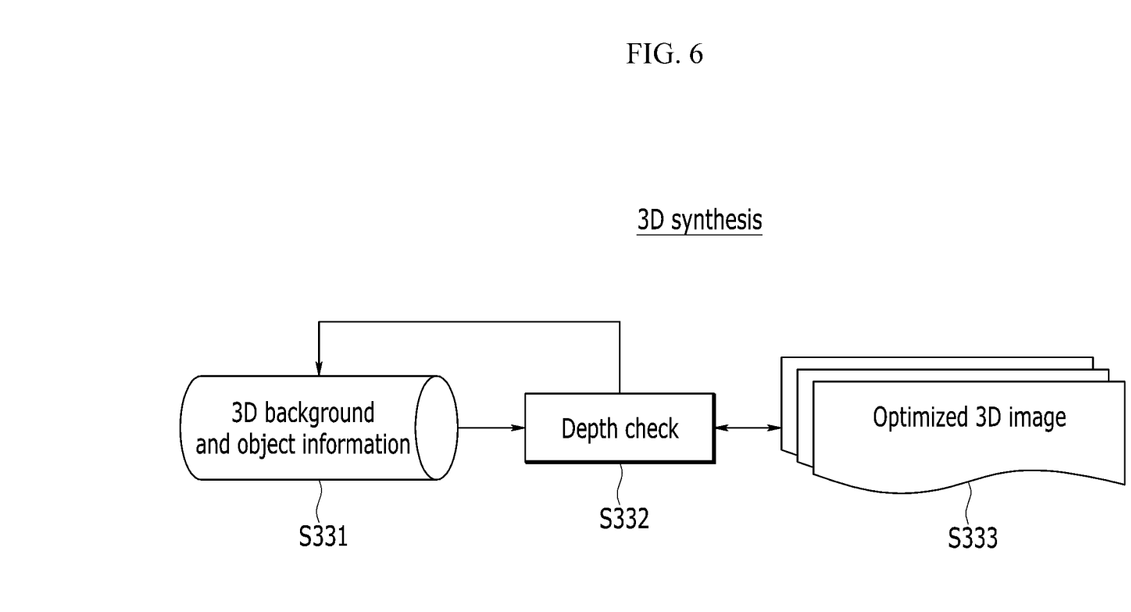
FIG. 6 is a drawing for explaining an example of synthesizing a 3D image in a 3D image synthesizing method according to an embodiment of the present invention.

FIG. 3 is a flowchart showing an example of a 3D image synthesizing method according to an embodiment of the present invention. FIG. 4 is a diagram for explaining an example of generating a 3D space in a 3D image synthesizing method according to an embodiment of the present invention, FIG. 5 is a diagram for explaining an example of generating a 3D object in a 3D image synthesizing method according to an embodiment of the present invention, and FIG. 6 is a drawing for explaining an example of synthesizing a 3D image in a 3D image synthesizing method according to an embodiment of the present invention.

Referring to FIG. 3 and FIG. 4, a 3D image synthesizing apparatus acquires a 3D background image and an IAD for each position in a space to be imaged. Specifically, the 3D image synthesizing apparatus divides a background by positions, and models a 3D image of the background to generate a background model for each position at S311. In some embodiments, the 3D image synthesizing apparatus may model the 3D image using a well-known 3D modeling algorithm or program. For example, the 3D image synthesizing apparatus may model the 3D image using 3D MAX which is a commercial stereoscopic modeling program.

The 3D image synthesizing apparatus sets an arbitrary IAD in the background model at each position in S312, and checks a depth of the background model according to the IAD at a corresponding position in S313. The 3D image synthesizing apparatus may repeat the operation of checking the depth while changing the IAD until an optimized depth is checked at S314. In some embodiments, the 3D image synthesizing apparatus may repeat the operation of checking the depth while increasing the IAD after setting a minimum value of the IAD as an initial value of the IAD. In some embodiments, the 3D image synthesizing apparatus may repeat the operation of checking the depth while decreasing the IAD after setting a maximum value of the IAD as an initial value of the IAD. Accordingly, the 3D image synthesizing apparatus may acquire an optimized IAD and the 3D space (i.e., the 3D background model) for each position.

After setting the optimized IADs for the background models at all the positions, the 3D image synthesizing apparatus obtains a 3D image of the background imaged by based on the optimized IADs at S315. In some embodiments, the 3D image synthesizing apparatus may set the IAD when the optimized depth is checked as the optimized IAD. In some embodiments, the 3D image synthesizing apparatus may set an IAD of a camera to the optimized IAD, and then obtain from the camera the 3D image of the background imaged by the camera. The 3D image synthesizing apparatus stores the optimized IAD at each position and imaged 3D image data of the background in the database at S316.

Through the above-described processes, the 3D image synthesizing apparatus may obtain the IAD for each position that can best represent the depth and the 3D image of the background in which the depth is best represented.

Referring to FIG. 3 and FIG. 5, the 3D image synthesizing apparatus obtains an object image based on the IAD of each position stored in the database. Specifically, the 3D image synthesizing apparatus selects a position corresponding to an object to be imaged from among the plurality of positions at S321. The 3D image synthesizing apparatus retrieves the IAD corresponding to the selected position from the database at S322. The 3D image synthesizing apparatus determines an IAD for the object based on the IAD retrieved from the database at S323 to S325, and obtains a 3D image of the object imaged based on the IAD for the IAD at S326. In some embodiments, the 3D image synthesizing apparatus may set the IAD of the camera to the IAD for the object, and obtain from the camera the 3D image of the object imaged by the camera. The 3D image synthesizing apparatus stores the 3D image of the object corresponding to each position in the database at S327.

In some embodiments, the IAD for the object may be equal to the IAD retrieved from the database. In some embodiments, the 3D image synthesizing apparatus may set the IAD for the object based on the IAD retrieved from the database. In some embodiments, the 3D image synthesizing apparatus may model at the selected position to generate an object model, and check a depth of the object model according to the IAD retrieved from the database at the corresponding position at S323. The 3D image synthesizing apparatus may repeat the operation of checking the depth while finely tuning the IAD until an optimized depth is checked at S324 and S325. Through repetition of this process, the 3D image synthesizing apparatus may set an optimized IAD for the object at the corresponding position and the optimized 3D object model. In some embodiments, the 3D image synthesizing apparatus may set the IAD when the optimized depth is checked as the optimized IAD for the object. The 3D image synthesizing apparatus may store the IAD for the object corresponding to each position in the database at S327.

Referring to FIG. 3 and FIG. 6, the 3D image synthesizing apparatus selects a position and synthesizes the 3D image of the background and the 3D image of the object corresponding to the selected position, which are stored in the database at S331. The 3D image synthesizing apparatus obtains a final 3D image by repeating the process of synthesizing the 3D image of the background and the 3D image of the object for a plurality of positions at S333. In some embodiments, when synthesizing the 3D image of the background and the 3D image of the object, the 3D image synthesizing apparatus may check the depths of the 3D image of the background and the 3D image of the object again at S332.

Through this process, the 3D image without a sense of incongruity in the depth can be generated. In addition, since the optimized IAD for each position can be set, it is possible to minimize setting of imaging parameters in an actual imaging environment. Accordingly, not only professional producers of 3D images but also ordinary people can easily create 3D image contents. For example, by synthesizing a 3D image of a performance hall and a 3D image of a performance, a 3D image in which the performance desired by a user produces in the performance hall selected by the user can be created.

Next, an example computing device capable of implementing a 3D image synthesizing apparatus or a 3D image synthesizing method according to an embodiment of the present invention is described with reference to FIG. 7.

Figure 7:
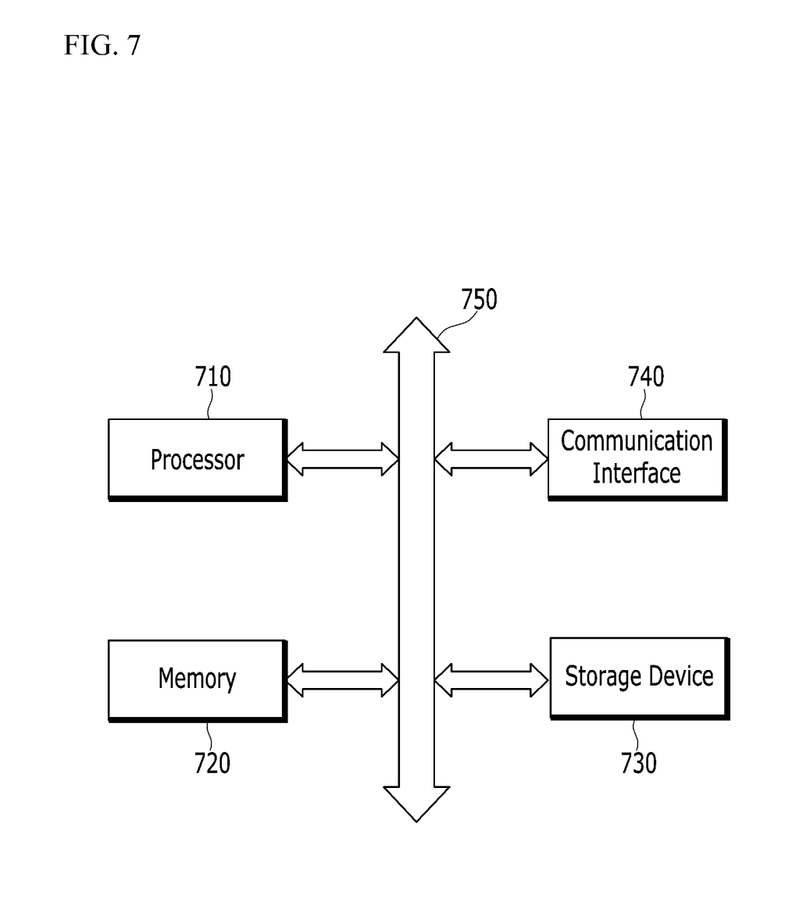
FIG. 7 is a diagram illustrating an example of a computing device according to an embodiment of the present invention.

FIG. 7 is a diagram illustrating an example of a computing device according to an embodiment of the present invention.

Referring to FIG. 7, a computing device includes a processor 710, a memory 720, a storage device 730, a communication interface 740, and a bus 750. The computing device may further include other general components.

The processor 710 controls an overall operation of each component of the computing device. The processor 710 may be implemented with at least one of various processing units such as a central processing unit (CPU), a microprocessor unit (MPU), a micro controller unit (MCU), a graphic processing unit (GPU), and an application processor (AP), and may be implemented as a parallel processing unit. Further, the processor 710 may perform operations on a program for executing the 3D image synthesizing method described above.

The memory 720 stores various data, commands, and/or information. The memory 720 may load a computer program from the storage device 730 to execute the 3D image synthesizing method described above. The storage device 730 may non-temporarily store a program. The storage device 730 may be implemented as a non-volatile memory. The storage device 730 may store a database.

The communication interface 740 supports wireless or wired communication of the computing device.

The bus 750 provides communication between components of the computing device. The bus 750 may be implemented as various types of buses, such as an address bus, a data bus, and a control bus.

The computer program may include instructions for causing the processor 710 to execute the 3D image synthesizing method when loaded into the memory 720. That is, the processor 710 may perform the 3D image synthesizing method by executing the instructions.

The 3D image synthesis method described above may be implemented as a computer-readable computer program on a computer-readable medium. In some embodiments, the computer-readable medium may be a removable recording medium or a fixed recording medium. In some embodiments, the computer-readable program recorded on the computer-readable medium may be transmitted to another computing device via a network such as the Internet, so that the computer program can be executed by another computing device.

In some embodiments, the computer program may include instructions of modeling a background to be imaged for each of positions to generate a background model at each of the positions, setting a first IAD of a camera at each of the positions based on the background model at each of the positions, obtaining a 3D image of the background imaged by the camera based on the first IAD, selecting a target position corresponding to an object to be imaged from among the positions, setting a second IAD of the camera at the target position based on the first IAD set at the target position, obtaining a 3D image of the object imaged by the camera based on the second IAD, and synthesizing the 3D image of the background and the 3D image of the object.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of synthesizing a 3D image performed by a computing device, the method comprising:
    modeling a background to be imaged for each of positions to generate a background model at each of the positions;
    setting a first inter-axial distance (IAD) of a camera at each of the positions based on the background model at each of the positions;
    obtaining a 3D image of the background imaged by the camera based on the first IAD;
    selecting a target position corresponding to an object to be imaged from among the positions;
    setting a second IAD of the camera at the target position based on the first IAD set at the target position;
    obtaining a 3D image of the object imaged by the camera based on the second IAD; and
    synthesizing the 3D image of the background and the 3D image of the object.

2. The method of claim 1, wherein the setting the first IAD comprises:
    changing an IAD of the camera;
    checking a depth of the background model according to the changed IAD at each of the positions;
    repeating the changing the IAD and the checking the depth until an optimized depth is checked; and
    setting the IAD when the optimized IAD is checked as the first IAD.

3. The method of claim 1, further comprising storing the first IAD and the 3D image of the background at each of the positions in a database.

4. The method of claim 3, wherein the setting the second IAD comprises retrieving the first IAD at the target position from the database.

5. The method of claim 1, wherein the second IAD at the target position is equal to the first IAD set at the target position.

6. The method of claim 1, wherein the setting the second IAD comprises:
    modeling the object at the target position to generate an object model;
    checking a depth of the object model according to the first IAD set at the target position; and
    setting the second IAD based on a result of checking the depth.

7. The method of claim 6, wherein the setting the second IAD based on the result comprises:
    repeating an operation of checking the depth while finely tuning an IAD of the camera until an optimized depth is checked; and
    setting the IAD when the optimized depth is checked as the second IAD.

8. The method of claim 1, further comprising storing the second IAD and the 3D image of the object at the target position in a database.

9. A 3D image synthesizing apparatus comprising:
    a memory configured to store one or more instructions; and
    a processor configured to, by executing the one or more instructions:
        model a background to be imaged for each of a plurality of positions to generate a background model at each of the plurality of the positions;
        set a first inter-axial distance (IAD) of a camera at each of the plurality of positions of the background to be imaged;
        obtain a 3D image of the background imaged by the camera based on the first IAD;
        select a target position corresponding to an object to be imaged from among the plurality of positions;
        set a second IAD of the camera at the target position based on the first IAD set at the target position;
        obtain a 3D image of the object imaged by the camera based on the second IAD; and
        synthesize the 3D image of the background and the 3D image of the object.

10. The 3D image synthesizing apparatus of claim 9, wherein the processor is configured to:
    generate a plurality of background models by modeling the background at the positions, respectively; and
    set the first IAD at each of the positions based on a background model at a corresponding position among the background models.

11. The 3D image synthesizing apparatus of claim 10, wherein the processor is configured to:

check a depth of the background model at the corresponding position according to an IAD of the camera at the corresponding position;
repeat an operation of changing the IAD until an optimized depth is checked; and
set the IAD when the optimized depth is checked as the first IAD.

12. The 3D image synthesizing apparatus of claim 9, wherein the processor is configured to:
generate an object model by modeling the object at the target position; and
set the second IAD at the target position based on the first IAD set at the target position and the object model.

13. The 3D image synthesizing apparatus of claim 12, wherein the processor is configured to:
repeat an operation of checking a depth of the object model at the target position according to an IAD of the camera at the target position and finely tuning the IAD, until an optimized depth is checked; and
set the IAD when the optimized depth is checked as the second IAD.

14. A method of synthesizing a 3D image performed by a computing device, the method comprising:
modeling a background to be imaged for each of a plurality of positions to generate a background model at each of the plurality of the positions;
setting a first inter-axial distance (IAD) of a camera at each of the plurality of positions of the background to be imaged;
obtaining a 3D image of the background imaged by the camera based on the first IAD;
selecting a target position corresponding to an object to be imaged from among the plurality of positions;
setting a second IAD of the camera at the target position based on the first IAD set at the target position; and
synthesizing the 3D image of the background imaged by the camera based on the first IAD and the 3D image of the object imaged by the camera based on the second IAD.

* * * * *